United States Patent
Kim et al.

(10) Patent No.: US 11,937,764 B2
(45) Date of Patent: Mar. 26, 2024

(54) CLEANING DEVICE HAVING VACUUM CLEANER AND DOCKING STATION

(71) Applicant: SAMSUNG ELECTRONICS CO., LTD., Suwon-si (KR)

(72) Inventors: Seehyun Kim, Suwon-si (KR); Youngchul Ko, Suwon-si (KR); Higon Koo, Suwon-si (KR); Kisup Lee, Suwon-si (KR); Hyunho Lee, Suwon-si (KR); Seungryong Cha, Suwon-si (KR); Seungwoo Choi, Suwon-si (KR); Kihwan Kwon, Suwon-si (KR); Hyeoncheol Kim, Suwon-si (KR); Hwagyu Song, Suwon-si (KR); Sungcheol Lee, Suwon-si (KR); Hyunju Lee, Suwon-si (KR); Ingyu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 17/388,477

(22) Filed: Jul. 29, 2021

(65) Prior Publication Data
US 2022/0039622 A1    Feb. 10, 2022

(30) Foreign Application Priority Data

Aug. 7, 2020   (KR) ................ 10-2020-0098952

(51) Int. Cl.
    *A47L 9/14*      (2006.01)
    *A47L 9/28*      (2006.01)
    *B01D 46/00*    (2022.01)

(52) U.S. Cl.
    CPC ............ *A47L 9/149* (2013.01); *A47L 9/1409* (2013.01); *A47L 9/2873* (2013.01);
(Continued)

(58) Field of Classification Search
    CPC ...... A47L 9/2873; A47L 9/149; A47L 9/1409; B01D 46/0036; B01D 46/0038; B01D 46/0043; B01D 2273/30; B01D 2279/55
See application file for complete search history.

(56) References Cited

U.S. PATENT DOCUMENTS

| | | | |
|---|---|---|---|
| 9,526,391 B2 | 12/2016 | Lee et al. | |
| 2013/0055521 A1* | 3/2013 | Lee ............... | A47L 11/4025<br>15/319 |

(Continued)

FOREIGN PATENT DOCUMENTS

| | | |
|---|---|---|
| CN | 210931148 U | 7/2020 |
| CN | 20200002098 U * | 9/2020 |

(Continued)

OTHER PUBLICATIONS

Korean Office Action dated Sep. 1, 2022 in Korean Patent Application No. 10-2022-0007382 (4 pages; 5 pages English translation).

(Continued)

*Primary Examiner* — Marc Carlson
(74) *Attorney, Agent, or Firm* — STAAS & HALSEY LLP

(57) ABSTRACT

Provided is a cleaning device including a vacuum cleaner including a dust collector into which dirt and dust is collected, a docking station connected to the dust collector and having a long axis extending in a first direction, and the docking station includes a docking part coupled to the dust collector to remove dirt and dust collected in the dust collector, a sucking device sucking up the dirt and dust and inside air in the dust collector docked with the docking part through the docking part, and a circulation duct arranged for the air sucked up by the sucking device to be circulated to the docking part.

14 Claims, 7 Drawing Sheets

(52) U.S. Cl.
CPC ..... *B01D 46/0036* (2013.01); *B01D 46/0038* (2013.01); *B01D 46/0043* (2013.01); *B01D 2273/30* (2013.01); *B01D 2279/55* (2013.01)

(56) References Cited

U.S. PATENT DOCUMENTS

| | | |
|---|---|---|
| 2020/0345196 A1 | 11/2020 | Innes et al. |
| 2021/0330157 A1* | 10/2021 | Conrad ................ A47L 9/22 |

FOREIGN PATENT DOCUMENTS

| | | | | |
|---|---|---|---|---|
| CN | 214048676 U | * | 8/2021 | .......... A47L 11/4027 |
| DE | 102011054162 A1 | * | 4/2013 | .............. A47L 9/02 |
| GB | 2560366 A | * | 9/2018 | .............. A47L 1/02 |
| GB | 20200074054 A | * | 9/2018 | |
| JP | 1-121028 | | 5/1989 | |
| JP | 2004-350852 A | | 12/2004 | |
| JP | 4205466 | | 1/2009 | |
| JP | 4939885 | | 5/2012 | |
| JP | 2016-116850 A | | 6/2016 | |
| JP | 2018-511387 | | 4/2018 | |
| KR | 2001-0098260 | | 11/2001 | |
| KR | 10-0442388 | | 7/2004 | |
| KR | 10-2008-0043695 A | | 5/2008 | |
| KR | 20090061461 A | * | 6/2009 | |
| KR | 10-1202916 | | 11/2012 | |
| KR | 10-2013-0025320 A | | 3/2013 | |
| KR | 10-2014-0118434 A | | 10/2014 | |
| KR | 10-2020-0074054 A | | 6/2020 | |
| KR | 10-2021-0128786 | | 10/2021 | |
| KR | 102354485 B1 | * | 1/2022 | |
| WO | WO-2009038281 A1 | * | 3/2009 | ............. A61L 9/014 |
| WO | WO-2018235931 A1 | * | 12/2018 | ............. A47L 5/362 |

OTHER PUBLICATIONS

Korean Office Action issued in Korean Application No. 10-2022-0007382 dated Mar. 4, 2022.
Korean Notice of Allowance for Korean Patent Application No. 10-2020-0098952 dated Oct. 18, 2021.
International Search Report for International Patent Application No. PCT/KR2021/009328 dated Nov. 25, 2021.

* cited by examiner

CLEANING DEVICE HAVING VACUUM CLEANER AND DOCKING STATION

CROSS-REFERENCE TO RELATED APPLICATION

This application is based on and claims priority under 35 U. S. C. § 119 to Korean Patent Application No. 10-2020-0098952 filed on Aug. 7, 2020, the disclosure of which is incorporated herein by reference in its entirety.

BACKGROUND

1. Field

The disclosure relates to a cleaning device including a vacuum cleaner and a docking station, and more particularly, to a docking station and a cleaning device capable of automatically discharging dust from the inside of a vacuum cleaner.

2. Discussion of Related Art

A vacuum cleaner is a device for doing cleaning by including a fan motor that generates sucking force to suck up dirt and dust or debris along with air, separating and collecting the dirt and dust from the air.

The vacuum cleaner includes a dust collector for collecting dirt and dust, and the user needs to periodically separate the dirt and dust collected in the dust collector from the vacuum cleaner and throw away the dirt and dust from the dust collector.

SUMMARY

According to an aspect of the disclosure, a cleaning device includes a vacuum cleaner including a dust collector collecting dirt and dust, and a docking station connected to the dust collector and having a long axis extending in a first direction, wherein the docking station includes a docking part coupled to the dust collector to remove dirt and dust collected in the dust collector, a sucking device sucking up the dirt and dust and inside air in the dust collector docked with the docking part through the docking part, and a circulation duct arranged for the air sucked up by the sucking device to be circulated to the docking part.

The sucking device may include a sucking fan sucking in air, and a sucking device outlet arranged for air moved by the sucking fan to be discharged out of the sucking device, wherein an end of the circulation duct may be connected to the outlet.

The docking part may include a seating space to which at least a portion of the dust collector is inserted, a docking part housing forming the seating space, wherein the other end of the circulation duct may be connected to the docking part housing to be connected to the seating space.

The circulation duct may include a duct outlet arranged for at least a portion of air moved from the one end of the circulation duct to be discharged out of the docking station.

A discharge area of the duct outlet may be formed to be smaller than a discharge area of the sucking device outlet.

The discharge area of the duct outlet may be formed to be 1/10 of the discharge area of the sucking device outlet.

The circulation duct may further include a deodorization filter arranged to remove a bad odor substance in the air moving in the circulation duct.

The deodorization filter may be arranged in the circulation duct and detachably coupled to the circulation duct.

The deodorization filter may include a first deodorization filter and a second deodorization filter having absorptive layers of different ingredients, and one of the first deodorization filter and the second deodorization filter may be selectively coupled to the circulation duct.

The docking station may further include a collecting part arranged between the docking part and the sucking device in the first direction to collect dirt and dust forced by a sucking air current produced by the sucking device to be moved from inside of the dust collector.

Air moved to the docking part through the circulation duct may be forced by the sucking device to be circulated to the sucking device via the collecting part.

The collecting part may include a collector arranged to be connected to the docking part and detachably placed in the collecting part, and collect the dirt and dust brought in from the docking part, and air moved to the docking part through the circulation duct may be forced to move into the collector.

The docking part may include a vibrator arranged to deliver vibration to the dust collector inserted to the docking part.

The docking part may include a seating space to which at least a portion of the dust collector is inserted and a docking part housing forming the seating space, and the vibrator may be installed in the docking part housing.

The vibrator may be arranged to be operated together when the sucking device is activated.

According to an aspect of the disclosure, a cleaning device includes a vacuum cleaner including a dust collector collecting dirt and dust, and a docking station connected to the dust collector and having a long axis extending in a first direction, wherein the docking station includes a docking part coupled to the dust collector to remove dirt and dust collected in the dust collector, a sucking device arranged under the docking part in the first direction to suck up the dirt and dust and inside air in the dust collector docked with the docking part through the docking part, a collecting part arranged between the docking part and the sucking device in the first direction to collect dirt and dust forced by a sucking air current produced by the sucking device to be moved from inside of the dust collector, and a circulation duct arranged such that the air moved by the sucking device from the dust collector to the sucking device flows back into the collecting part and is circulated to the sucking device.

The sucking device may include a sucking fan sucking in air, and a sucking device outlet arranged for air moved by the sucking fan to be discharged out of the sucking device, wherein an end of the circulation duct may be connected to the outlet and the other end of the circulation duct may be connected to the docking part.

The sucking device may include a sucking fan sucking in air, and a sucking device outlet arranged for air moved by the sucking fan to be discharged out of the sucking device, wherein an end of the circulation duct may be connected to the outlet and the other end of the circulation duct may be connected to the collecting part.

According to another aspect of the disclosure, a cleaning device includes a vacuum cleaner including a dust collector collecting dirt and dust, and a docking station connected to the dust collector and having a long axis extending in a first direction, wherein the docking station includes a docking part coupled to the dust collector to remove dirt and dust collected in the dust collector, a sucking device sucking up the dirt and dust and inside air in the dust collector docked with the docking part through the docking part, and a vibrator producing vibration to be delivered to the dust collector inserted to the docking part.

The docking station may further include a flow rate changer arranged to selectively change an amount of sucking air current supplied to the dust collector to change a flow rate of air in the dust collector when the sucking device is operated.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
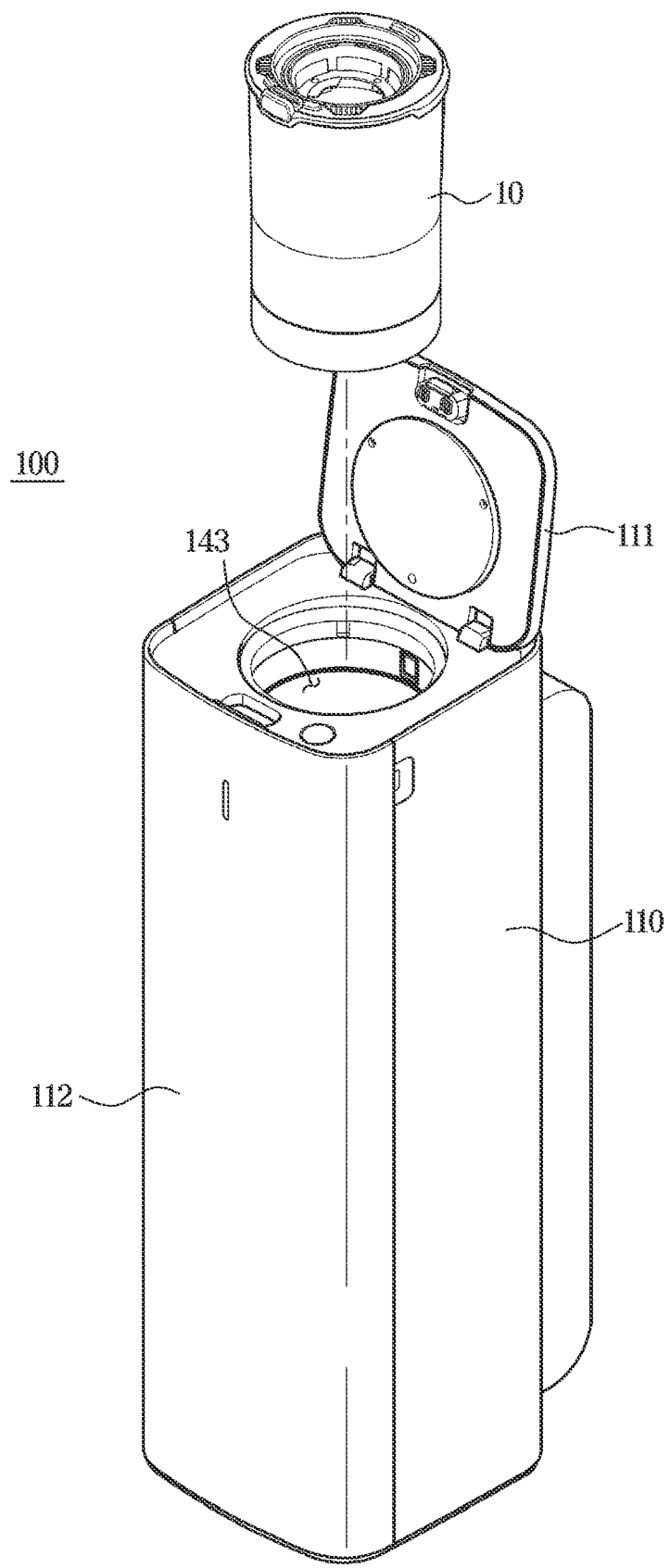
FIG. 1 is a perspective view of a cleaning device, according to an embodiment of the disclosure.

Embodiments and features as described and illustrated in the disclosure are merely examples, and there may be various modifications replacing the embodiments and drawings at the time of filing this application.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "~and/or ~," or the like.

The terms "upper direction", "lower side" and "front-rear direction" as herein used are defined with respect to the drawings, but the terms may not restrict the shape and position of the respective components.

The disclosure provides a cleaning device including a docking station of a vacuum cleaner, which is capable of automatically discharging dirt and dust from a dust collector.

The disclosure also provides a cleaning device able to reduce noise and bad odor emitted from air discharged from a docking station.

The disclosure also provides a cleaning device that makes dirt and dust collected in a dust collector easily fall off.

Reference will now be made in detail to embodiments of the disclosure, which are illustrated in the accompanying drawings.

Figure 2:
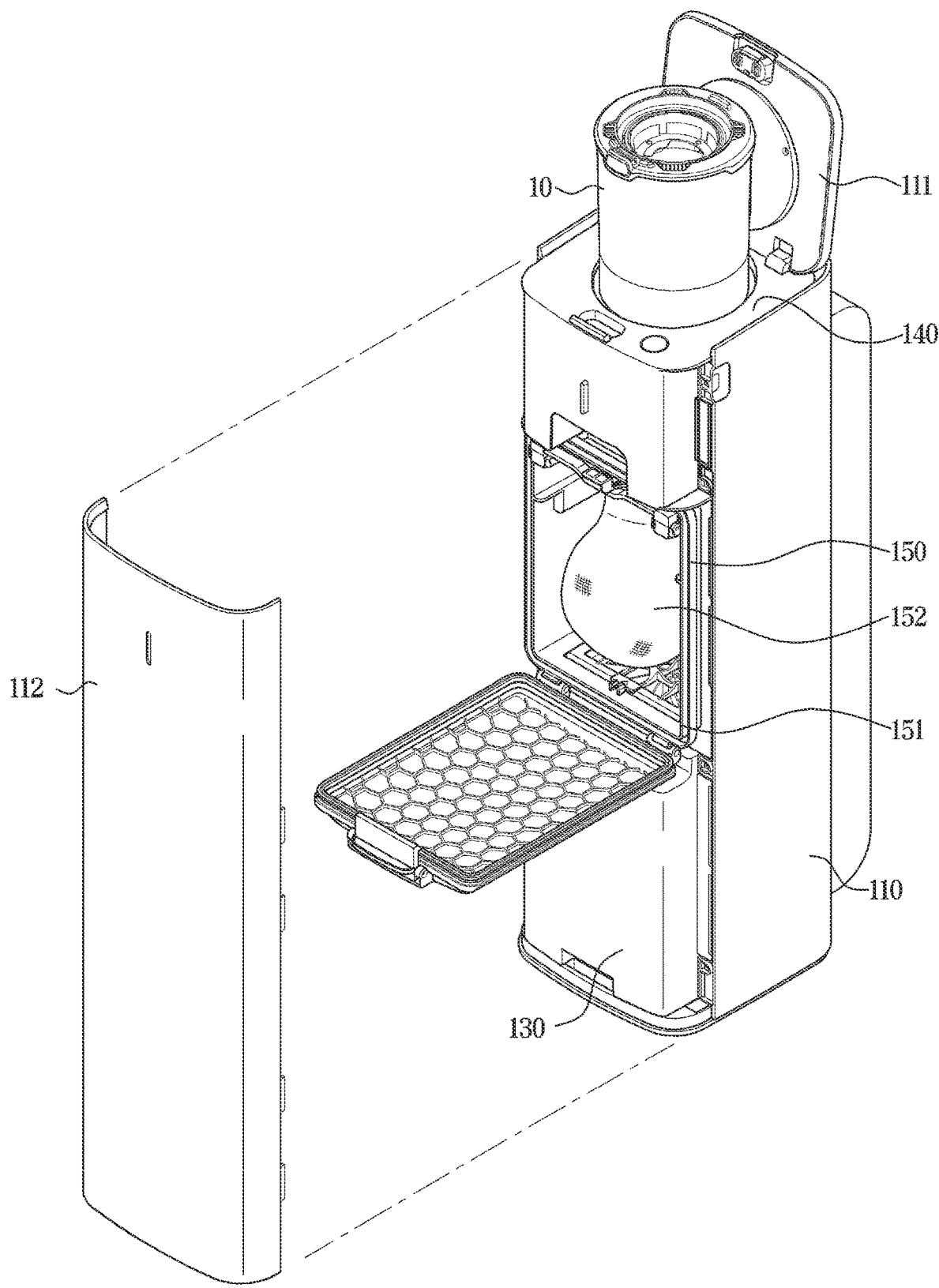
FIG. 2 shows a docking station with some part separated therefrom, according to an embodiment of the disclosure.
Figure 3:
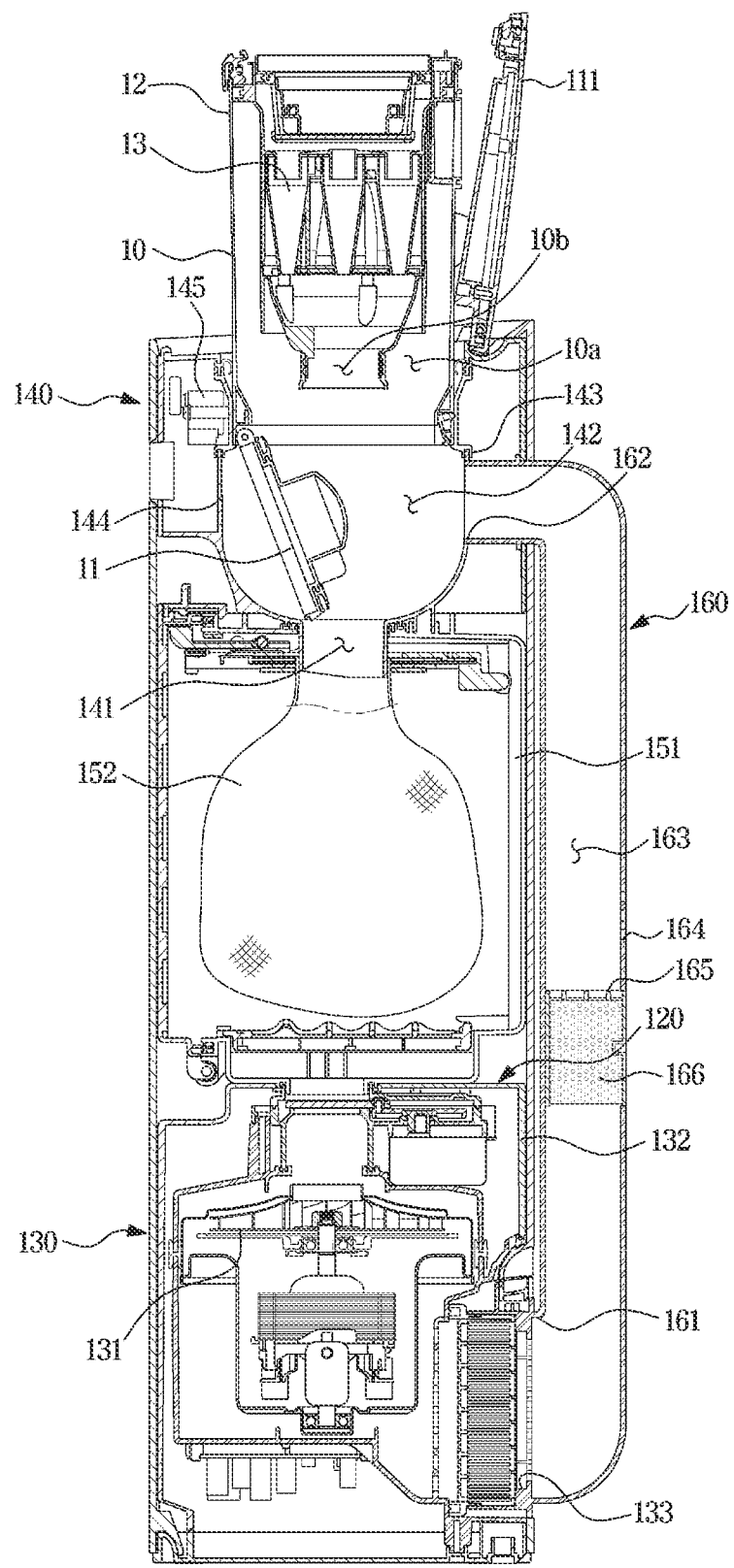
FIG. 3 is a side cross-sectional view of a cleaning device, according to an embodiment of the disclosure.

FIG. 1 is a perspective view of a cleaning device, according to an embodiment of the disclosure, FIG. 2 shows a docking station with some part separated therefrom, according to an embodiment of the disclosure, and FIG. 3 is a side cross-sectional view of a cleaning device, according to an embodiment of the disclosure.

Referring to FIGS. 1 and 3, a cleaning device 1 may include a cleaner (not shown) and a docking station 100.

The cleaner may include a cleaner body (not shown) and a dust collector 10 detachably coupled to the cleaner body.

According to an embodiment of the disclosure, the cleaning device 1 may automatically dispose of the waste through the docking station 100 when the dust collector 10 of the cleaner is docked with the docking station 100.

In other words, the cleaning device 1 may automatically discharge dust in the dust collector 10 when the dust collector 10 is separated from the cleaner and then docked with the docking station 100. Accordingly, the user does not need to dock the whole cleaner with the docking station 100 but may dock the dust collector 10 with the docking station 100. This makes it possible to reduce the size of the docking station 100, and makes it easy to automatically discharge dust in the dust collector 10 by simply separating the dust collector 10.

The docking station 100 may include a main body housing 110 that defines an exterior of the docking station 100.

The main body housing 110 may have a long axis extending in a direction. For example, the long axis of the main body housing 110 may extend vertically. Along with this, the docking station 100 may be almost shaped like a box that extends in the vertical direction.

The main body housing 110 may include a panel 112 detachably arranged on a front surface of the main body housing 110. The panel 112 may be arranged not exclusively on the front surface but may be arranged on a side surface or a rear surface of the main body housing 110 to be separable from the main body housing 110.

As the panel 112 is separated from the main body housing 110, the user may open a collecting part 150, which will be described later, and easily replace a dust bag 152 placed in the collecting part 150.

The docking station 100 may include a sucking device 130 to discharge dust collected in the dust collector 10 from the dust collector 10. The sucking device 130 may be arranged inside the main body housing 110.

The docking station 100 may include a controller (not show) to which the user may enter a signal to operate the sucking device 130. When the dust collector 10 is docked with the docking station 100, the user may enter a signal to the controller to control the docking station 100 to discharge dirt and dust or debris collected in the dust collector 10.

It is not, however, limited thereto. For example, the controller of the docking station 100 may be configured to activate the sucking device 130 upon receiving a sensing value from a sensor (not shown) when the dust collector 10 is docked with the docking station 100, so that the docking station 100 may automatically operate the sucking device 130 when docked with the dust collector 10 without receiving an extra signal from the user.

The docking station 100 may include a docking part 140 arranged for the dust collector 10 to be docked with the docking station 100. The docking part 140 may be arranged on a top of the main body housing 110.

The sucking device 130 may be arranged inside the main body housing 110. Specifically, the sucking device 130 may be arranged under the docking part 140 in a direction in which the main body housing 110 extends.

The docking station 100 may include the collecting part 150 to collect dirt and dust discharged from the dust collector 10. The collecting part 150 may be arranged inside the main body housing 110. The collecting part 150 may be arranged above the sucking device 130.

The docking part 140, the collecting part 150, and the sucking device 130 may be arranged in series in the direction in which the main body housing 110 extends.

The docking station 100 may include a sucking path 141 that connects the docking part 140 to the collecting part 150 so that the dirt and dust discharged from the dust collector 10 is sucked into the collecting part 150 via the docking part 140. The sucking path 141 may extend in the direction in which the main body housing 110 extends to connect the docking part 140 to the collecting part 150.

The docking part 140 may include a seating space 142 that is connected to the sucking path 141 and in which the dust collector 10 is seated. The docking station 100 may include a docking opening 143 formed for the dust collector 10 to be docked with the docking station 100 from outside.

The docking part 140 may include a docking part housing 144 arranged inside the docking station 100 to form the seating space 142. The docking part housing 144 defines the seating space 142, and the top of the docking part housing 144 may be opened to the outside with the docking opening 143.

The main body housing 110 may include a main body door 111 to open or close the top of the docking part 140.

The main body door 111 may be provided to open or close the docking opening 143 of the docking part 140. To dock the dust collector 10 with the docking station 100, the user may open the main body door 111 and put in the dust collector 10 through the docking opening 143.

At least a portion of the dust collector 10 may be inserted through the docking opening 143. The dust collector 10 may be seated in the seating space 142 through the docking opening 143.

The docking opening 143 may be opened in a direction in which the long axis of the main body housing 110 extends. That is, the docking opening 143 may be opened toward the top of the main body housing 110.

The seating space 142 may have one end connected to the docking opening 143 and the other end connected to the sucking path 141.

The dust collector 10 may include a body 12 having the form of a cylinder. The body 12 may be opened or closed by a dust collector door 11 installed at one end of the body 12.

The dust collector 10 may include a cyclone 13 arranged inside the body 12. The dust collector 10 may be arranged such that dirt and dust is collected under the cyclone 13. The dust collector 10 may include a first dust collector 10a for collecting dirt and dust with relatively large volume. Which is collected for the first time, and a second dust collector 10b for collecting dirt and dust with relatively small volume, which is collected by the cyclone 13.

Both the first dust collector 10a and the second dust collector 10b may be opened to the outside when the dust collector door 11 is Open.

Accordingly, the dirt and dust collected in the dust collector 10 may be easily discharged out of the dust collector 10 when the dust collector door 11 installed at the one end of the body 12 is open.

When the dust collector 10 is seated in the seating space 142, docking between the dust collector 10 and the docking station 100 may be completed.

The dust collector 10 may be docked in the seating space 142 in a direction in which the long axis of the main body housing 110 extends. The dust collector 10 may be docked in the seating space 142 in a direction in which an extension axis of the cylindrical shape of the body 12 extends.

The long axis of the main body housing 110 and the extension axis of the dust collector 10 may substantially correspond to each other when the dust collector 10 is docked with the docking station 100.

Although not shown, a sensor (not shown) for detecting the dust collector 10 seated in the seating space 142 may be arranged between the docking opening 143 and the seating space 142. The sensor may be provided as a switch unit.

In this case, when the dust collector 10 is seated in the seating space 142, a controller (not shown) may determine through the switch unit whether the dust collector 10 is docked with the docking station 100.

When the dust collector 10 is docked with the docking station 100, at least a portion of the dust collector 10 may be inserted to the docking part 140 through the docking opening 143. Specifically, the dust collector door 11 installed at one end of the body 12 of the dust collector 10 may be opened in the seating space 142 formed in the docking part 140.

As the dust collector door 11 is opened in the docking part 140, the dirt and dust collected in the dust collector 10 may be discharged from within the docking station 100 without being scattered out.

Although not shown, the dust collector 10 may include a fixing member (not shown) arranged at one end of the body 12 to fix the dust collector door 11.

The dust collector door 11 may be coupled to the body 12 to be rotated against the body 12. The fixing member may be provided to fix the dust collector door 11 for the dust collector door 11 to close one end of the body 12.

The fixing member may be pressurized by external force to be decoupled from the dust collector door 11. Specifically, when pressurized by the external force, the fixing member may be decoupled from the dust collector door 11.

When the dust collector 10 is seated in the seating space 142 through the docking opening 143, the docking part 140 may pressurize the fixing member of the dust collector 10 so that the dust collector 10 is docked with the docking part 140 and at the same time, the dust collector door 11 is opened.

In this regard, the docking part 140 may include an opening guide (not shown) to pressurize the fixing member of the dust collector 10 when the dust collector 10 is seated. The opening guide may be arranged between the docking opening 143 and the seating space 142 to pressurize the fixing member of the dust collector 10 inserted through the docking opening 143.

The sucking path 141 may be connected to the collecting part 150 from the docking part 140. The sucking path 141 may deliver a flow of air current produced by the sucking device 130 to the dust collector 10. Specifically, a sucking air current produced by the sucking device 130 may be delivered into the dust collector 10 along the sucking path 141 and the seating space 142 via the collecting part 150, forcing the dirt and dust in the dust collector 10 to be discharged into the seating space 152 from the dust collector 10 with the flow of air current and then collected by the collecting part 150.

The collecting part 150 may include a collecting part housing 151. The collecting part housing 151 may form an internal space. The collecting part 150 may include a dust bag 152 arranged in the internal space of the collecting part 150 to collect dirt and dust flowing in through the sucking path 141.

The dust bag 152 may be formed with a substance that allows air to pass through the substance but prevents dirt and dust from passing through the substance, to collect the dirt and dust flowing into the collector 150 from the dust collector 10.

The dust bag 152 may be connected directly to the sucking path 141 and may be arranged to be separable from the collecting part 150.

When the docking station 100 is activated and dirt and dust is collected in the dust bag 152, the user may remove the panel 112, open the collecting part housing 151 to remove the dust bag 152 from the collecting part 150, and throw out the collected dirt and dust from the docking station 100.

Although not shown, the collecting part 150 may include an additional dust collector (not shown) in addition to the dust bag 152. An internal space of the additional dust collector may be formed to be larger than the internal space of the dust collector 10, and may include the cyclone to collect minute dirt and dust as in the dust collector 10.

The sucking device 130 may include a sucking fan 131 and a sucking device housing 132 that forms an internal space to accommodate the sucking fan 131.

The sucking device 130 may include a sucking device outlet 133 arranged on a side of the sucking device housing 132 to discharge air sucked in through the sucking fan 131 out of the sucking device 130.

The sucking device 130 may be provided to produce a sucking air current in the main body housing 110 by sucking in and discharging air through the sucking fan 131.

The sucking air current produced by the sucking fan 131 may be supplied to the dust collector 10 from the internal space of the sucking device housing 132 through the collecting part 150 and the sucking path 141.

The docking station 100 may include a flow rate changer 120 arranged to selectively change a rate of the sucking air current supplied to the dust collector 10.

The sucking air current supplied from the sucking device 130 may force the air and dirt and dust inside the dust collector 10 to be discharged out through the sucking path 141, in which case some of the dirt and dust may be blocked by an internal part of the dust collector 10 from being discharged out.

For example, when dirt and dust such as hair is stuck at an internal part of the dust collector 10, the dirt and dust may not fall off by the sucking air current from the dust collector 10 and may remain in the dust collector 10.

The sucking air current delivered into the dust collector 10 may be produced to be just directed in the downward direction to which the body 12 of the dust collector 10 is opened. Hence, some of the dirt and dust may have resistance in the direction in which the sucking air current is produced, and may not fall out of the dust collector 10.

This may prevent the dirt and dust in the dust collector 10 from being effectively removed therefrom.

To solve the aforementioned problem, the docking station 100 according to an embodiment of the disclosure may include the flow rate changer 120 to optionally provide additional outside air into the dust collector 10 in addition to the sucking air current.

The flow rate changer 120 may variously change the flow of air inside the dust collector 10 by changing the rate of a flow in the dust collector 10 while the sucking air current is supplied to suck in air in the dust collector 10 by the sucking device 130.

The flow rate changer 120 may be arranged inside the main body housing 110. The flow rate changer 120 may be arranged between the collecting part 150 and the sucking device 130. Specifically, the flow rate changer 120 may be arranged between the collecting part 150 and a fluid path connected to the sucking device 130.

It is not, however, limited thereto, and the flow rate changer 120 may be arranged between the collecting part 150 and the sucking path 141.

The sucking device 130, the flow rate changer 120, the collecting part 150, and the docking part 140 may all be arranged inside the main body housing 110.

The docking part 140, the collecting part 150, the flow rate changer 120, and the sucking device 130 may be arranged in series in the vertical direction.

The sucking air current produced from the sucking device 130 may be formed when the air outside the main body housing 110 is forced by the sucking fan 131 to flow into the sucking fan 131 and to be discharged out of the main body housing 110 through the sucking fan 131.

In other words, when the air outside the main body housing 110 is forced to flow into the sucking fan 131 after sequentially passing through the inside of the dust collector 10, the docking part 140, the collecting part 150, and the flow rate changer 120 and to be discharged out of the main body housing 110 through the sucking fan 131, the sucking air current may be produced.

In this case, the air to be discharged through the sucking fan 131 may be discharged out of the docking station 100 after sequentially passing through the sucking device housing 132 and the main body housing 110.

The docking station 100 may include a circulation duct 160 that allows air to be moved to the docking part 140 without letting the air directly discharged out of the docking station 100 so that the air sucked in and discharged by the sucking device 130 may be circulated inside the docking station 100.

The circulation duct 160 will now be described in detail.

Figure 4:
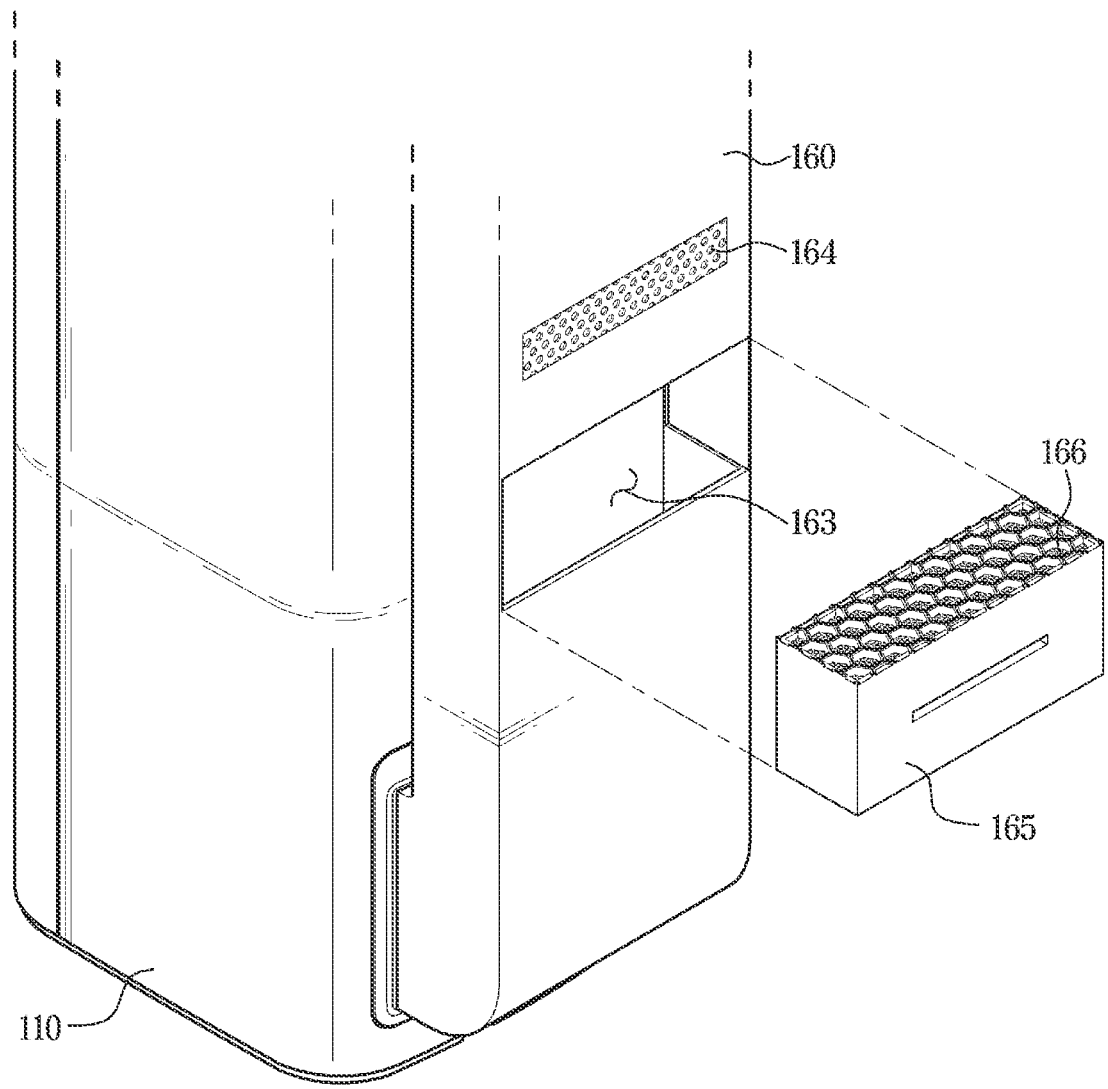
FIG. 4 is a rear perspective view of a cleaning device, according to an embodiment of the disclosure.
Figure 5:
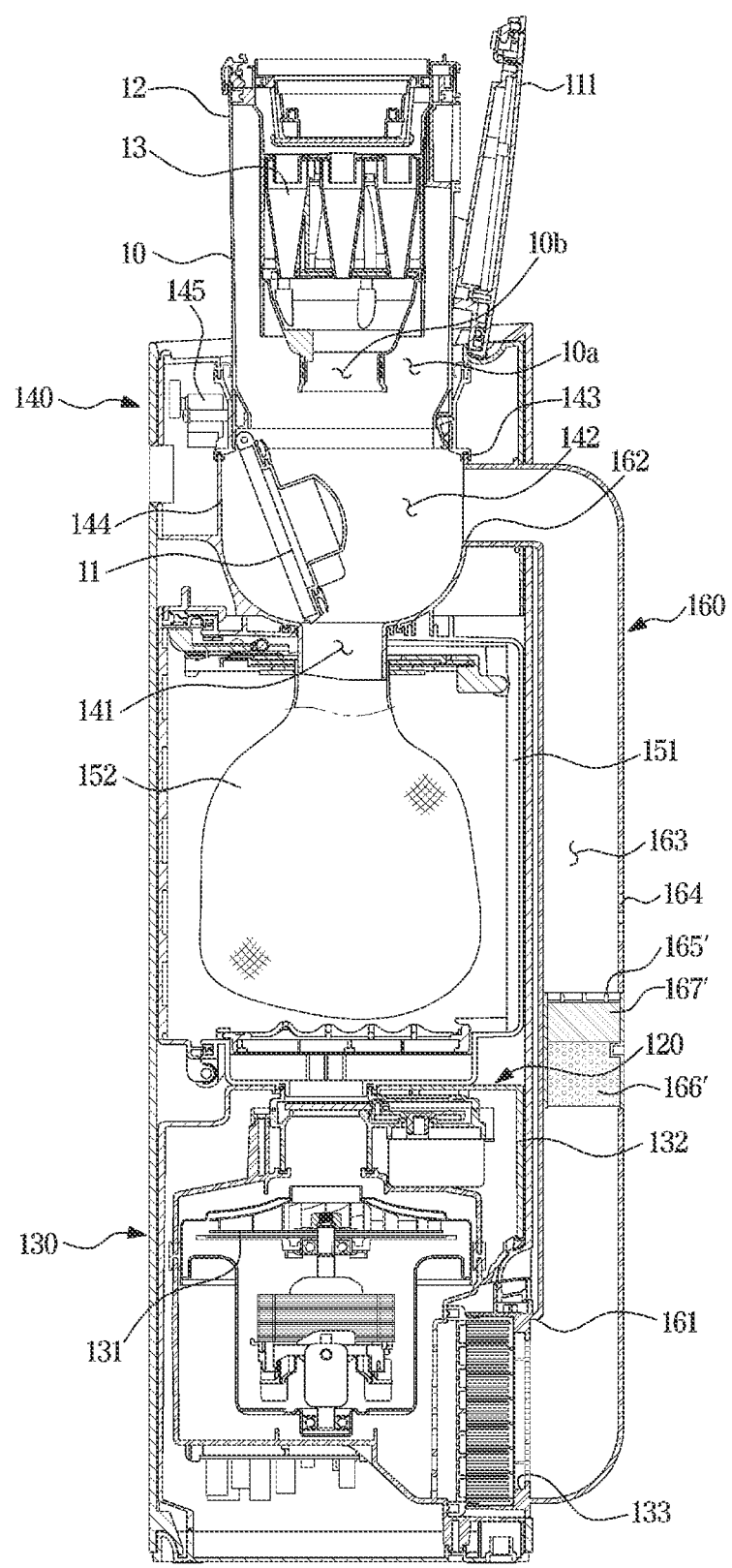
FIG. 5 is a side cross-sectional view of a cleaning device, according to an embodiment of the disclosure.

FIG. 3 is a side cross-sectional view of a cleaning device, according to an embodiment of the disclosure, FIG. 4 is a rear perspective view of a cleaning device, according to an embodiment of the disclosure, and FIG. 5 is a side cross-sectional view of a cleaning device, according to an embodiment of the disclosure.

The sucking device 130 allows air to be discharged through the sucking device outlet 133, in which case when the air is discharged directly to the outside of the main body housing 110, noise from the docking station 100 may increase due to the discharging of the air.

The sucking device outlet 133 included in the sucking device 130 may have an area larger than a certain size to maintain performance of the sucking fan 131.

The air discharged through the sucking device outlet 133 is discharged out of the docking station 100 through an outlet additionally provided at the main body housing 110, in which case when a discharge area of the outlet at the main body housing 110 is formed to have a size corresponding to the sucking device outlet 133, a noise problem of the docking station 100 may arise because the noise level is proportional to the discharge area.

As described above, the discharge area of the sucking device outlet 133 may have a certain size to maintain performance of the sucking device 130.

In an embodiment of the disclosure, in order to reduce the noise occurring from the docking station 100 when the outlet additionally provided at the main body housing 110 is smaller in size than the discharge area of the sucking device outlet 133, the docking station 100 may include the circulation duct 160 to allow a portion of the air discharged from the sucking device 130 to be discharged out of the docking station 100 and the other portions of the air to be circulated inside the docking station 100.

The circulation duct 160 may have one end 161 connected to the sucking device 130 and the other end 162 connected to the docking part 140. Accordingly, air is circulated in the docking station 100 because the air discharged from the sucking device 130 may flow into the docking part 140 through the circulation duct 160 and the air brought into the docking part 140 may be forced by the sucking device 130 to flow back into the sucking device 130.

Specifically, the one end 161 of the circulation duct 160 may be connected to the sucking device housing 132 to be connected to the sucking device outlet 133. The other end 162 of the circulation duct 160 may be connected to the docking part housing 143 to be connected to the seating space 142 of the docking part 140.

A fluid path 163 is formed in the circulation duct 160 so that the air brought in from the one end 161 of the circulation duct 160 is moved to the other end 162 of the circulation duct 160.

Accordingly, the whole air discharged from the sucking device 130 may be brought into the circulation duct 160.

The circulation duct 160 may include a circulation duct outlet 164 provided for a portion of the air brought into the circulation duct 160 to be discharged out of the docking station 100. The circulation duct outlet 164 may be connected to the fluid path 163 of the circulation duct 160.

Accordingly, a portion of the air moving along the fluid path 163 may be discharged out of the docking station 100 through the circulation duct outlet 164 and the other portions of air may be moved along the circulation duct 160 from the one end 161 of the circulation duct 160 to the other end 162 and may flow into the docking part 140.

In an embodiment of the disclosure, the circulation duct 160 may be arranged on an outer side of the main body housing 110, but it is not limited thereto. For example, the circulation duct 160 may be arranged on inner side of the main body housing 110. In this case, the circulation duct outlet 164 may be arranged to be connected to the main body housing 110 to discharge air out of the main body housing 110.

The circulation duct 160 may extend in the first direction in which the main body housing 110 extends. This is because the docking part 140 and the sucking device 130 are arranged in the first direction.

When the docking part 140 and the sucking device 130 are arranged in a left-to-right or front-to-back direction instead of the first direction, the circulation duct 160 may be provided to extend in the corresponding direction.

As described above, the air brought by the sucking device 130 into the sucking device 130 may flow into the sucking device 130 through the docking part 140 and the collecting part 150 from the inside of the dust collector 10. Dirt and dust present in the air is collected by the collecting part 150, so the air discharged after going through the sucking device 130 is pure air with the dirt and dust removed.

Accordingly, the air flowing into the circulating duct 160 may flow back into the docking part 140 in a pure state, so the pure air may be circulated in the docking station 100.

Furthermore, the air may absorb heat from the heated sucking fan 131 while passing through the sucking device 130, so that high temperature air may be circulated in the docking station 100.

The circulating air with high temperature may be moved into and pass through the dust bag 152 of the collecting part 150 and then may flow into the sucking device 130. In this case, moisture collected along with the dirt and dust in the dust bag 152 may be evaporated at the high temperature, thereby removing a bad smell likely to be emitted from the moisture collected in the dust bag 152.

The circulation duct outlet 164 may be formed to have a smaller size than the discharge area of the sucking device outlet 133 of the sucking device 130.

This may reduce noise from the discharging as compared to a case when the circulation duct outlet 164 has a size corresponding to the discharge area of the sucking device outlet 133.

The circulation duct outlet 164 may be formed to be $1/10$ or less of the discharge area of the sucking device outlet 133 of the sucking device 130.

In this case, $1/10$ of the air discharged from the sucking device outlet 133 may be discharged out of the docking station 100 and $9/10$ of the air may be circulated in the docking station 100.

The discharging noise may be further reduced the higher the ratio of an amount of air circulated in the docking station 100 to an amount of air discharged out of the docking station 100. Furthermore, an efficiency of removing a bad smell likely to be emitted from the collecting part 150 may increase as the pure air with high temperature is circulated.

The circulating duct 160 may include a deodorization filter 165 arranged in the fluid path 163.

The deodorization filter 165 may be provided to remove substances in air, which emit bad smells, when the air moving in the fluid path 163 passes through the deodorization filter 165. Accordingly, emission of bad smells from the air discharged through the circulation duct outlet 164 may be prevented.

Specifically, the deodorization filter 165 may be arranged before the circulation duct outlet 164 in a direction in which the air is moving in the fluid path 163. Accordingly, the air moving in the fluid path 163 passes through the deodorization filter 165 before being discharged through the circulation duct outlet 164, thereby getting rid of a bad smell in the air discharged out of the docking station 100.

The deodorization filter 165 may include a deodorization layer 166 that allows air to pass through and collects substances emitting a bad smell in the air. The deodorization layer 166 may be made of a material such as charcoal.

The deodorization filter 165 may be provided to be separable from the circulation duct 160. In other words, the deodorization filter 165 may be separated from the docking station 100. The deodorization filter 165 may be provided in a cartridge type. Hence, the user may easily replace or clean the deodorization filter 165.

The deodorization filter 165 may include a first deodorization filter 165 having the single deodorization layer 166 and a second deodorization filter 165' having a plurality of deodorization layers 166' and 167'.

The second deodorization filter 165' may include a first layer 166' corresponding to the deodorization layer 166 of the first deodorization filter 165 and a second layer 167' having an additional function.

The second layer 167' may be made of any of various members such as an absorptive member to further reduce the noise, a fragrance-additive member to add a fragrance to the air circulating in the circulation duct 160, a fine dust collecting member to further collect fine dust, or an anti-bacterial member.

The user may select one of the first and second deodorization filters 165 and 165' and couple it to the circulation duct 160. For example, in a normal situation, the user may activate the docking station 100 after coupling the first deodorization filter 165 to the circulation duct 160, or may activate the docking station 100 after replacing the first deodorization filter 165 with the second deodorization filter 165' as required.

A vibrator 145 will now be described in detail.

Figure 6:
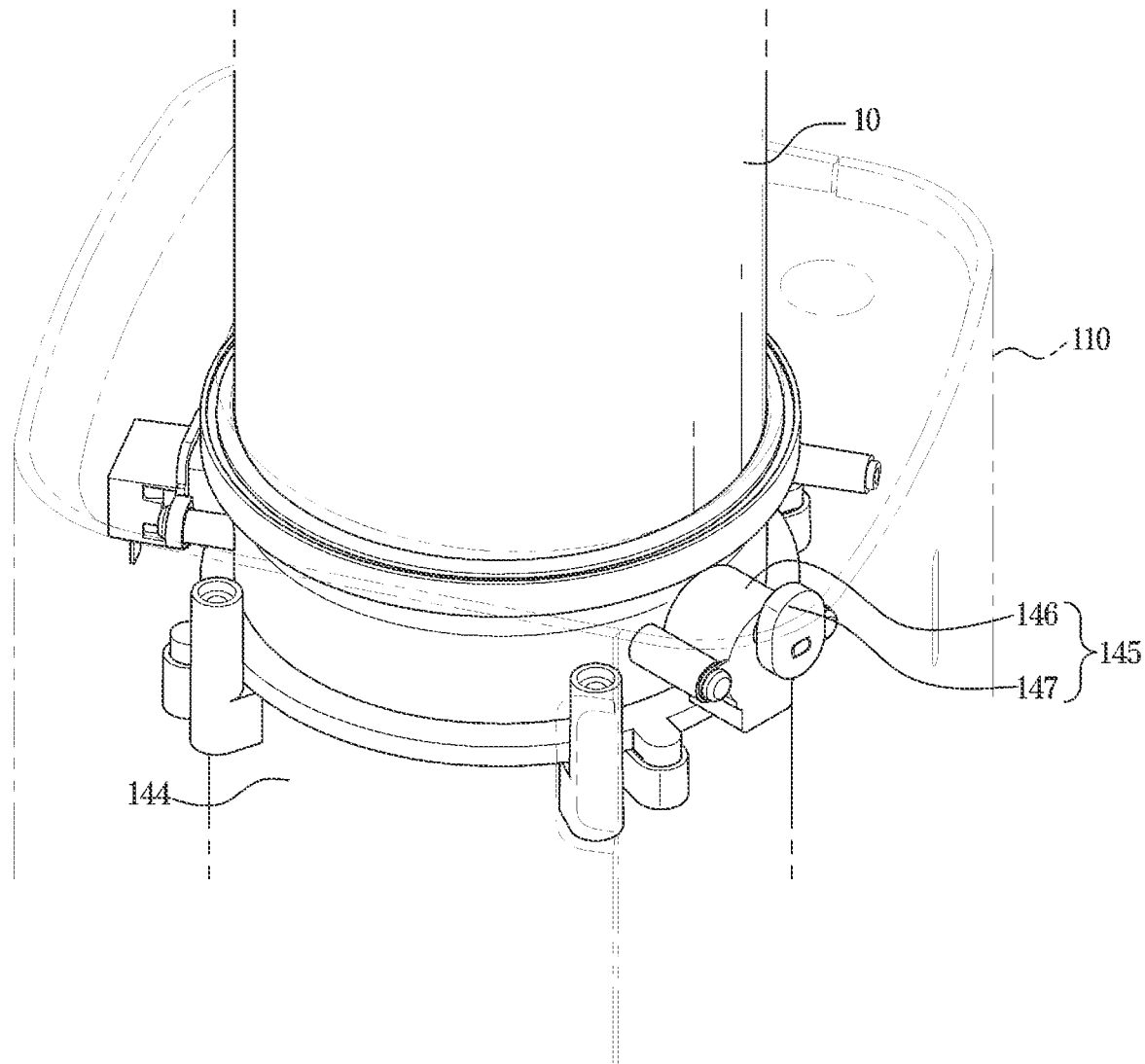
FIG. 6 shows the inside of a docking part of a docking station of a cleaning device, according to an embodiment of the disclosure.

FIG. 6 shows the inside of a docking part of a docking station of a cleaning device, according to an embodiment of the disclosure.

The docking station 100 may include a vibrator 145 for physically pressurizing the dust collector 10 when the dust collector 10 is docked with the docking part 140. The vibrator 145 may be arranged in the docking part 140.

The vibrator 145 may generate vibration.

The vibrator 145 may be installed on the docking part housing 144. The vibration generated from the vibrator 145 may be delivered to the docking part housing 144, and the vibration at the docking part housing 144 may be delivered to the dust collector 10.

As the vibration is delivered to the dust collector 10, dirt and dust in the dust collector 10 may efficiently fall off due to physical pressure applied to the dust collector 10 when the dirt and dust is thrown away from the inside of the dust collector 10.

The controller of the docking station 100 may control the vibrator 145 to be operated together with the sucking device 130 when the sucking device 130 is activated.

The vibrator 145 may include a driving motor 146, and a mass body 147 eccentrically fixed to the driving motor 146. Vibration may be generated when the mass body 147 eccentrically fixed to the driving motor 146 is eccentrically rotated.

The controller of the docking station 100 may be configured to control an amount of rotation of the driving motor 146. Accordingly, the controller of the docking station 100 may control the vibrator 145 to have an amount of vibration changed according to circumstances.

Specifically, the user may select a driving mode based on a property of the dirt and dust collected in the dust collector 10 and enter the driving mode to the docking station 100, and according to the driving mode, the controller of the docking station 100 may control the amount of rotation of the vibrator 145.

The cleaning device 1 according to another embodiment of the disclosure will now be described. Other parts than the circulation duct 160 are the same as those in the cleaning device 1 according to the previous embodiment of the disclosure, so the description thereof will not be repeated in the following description.

Figure 7:
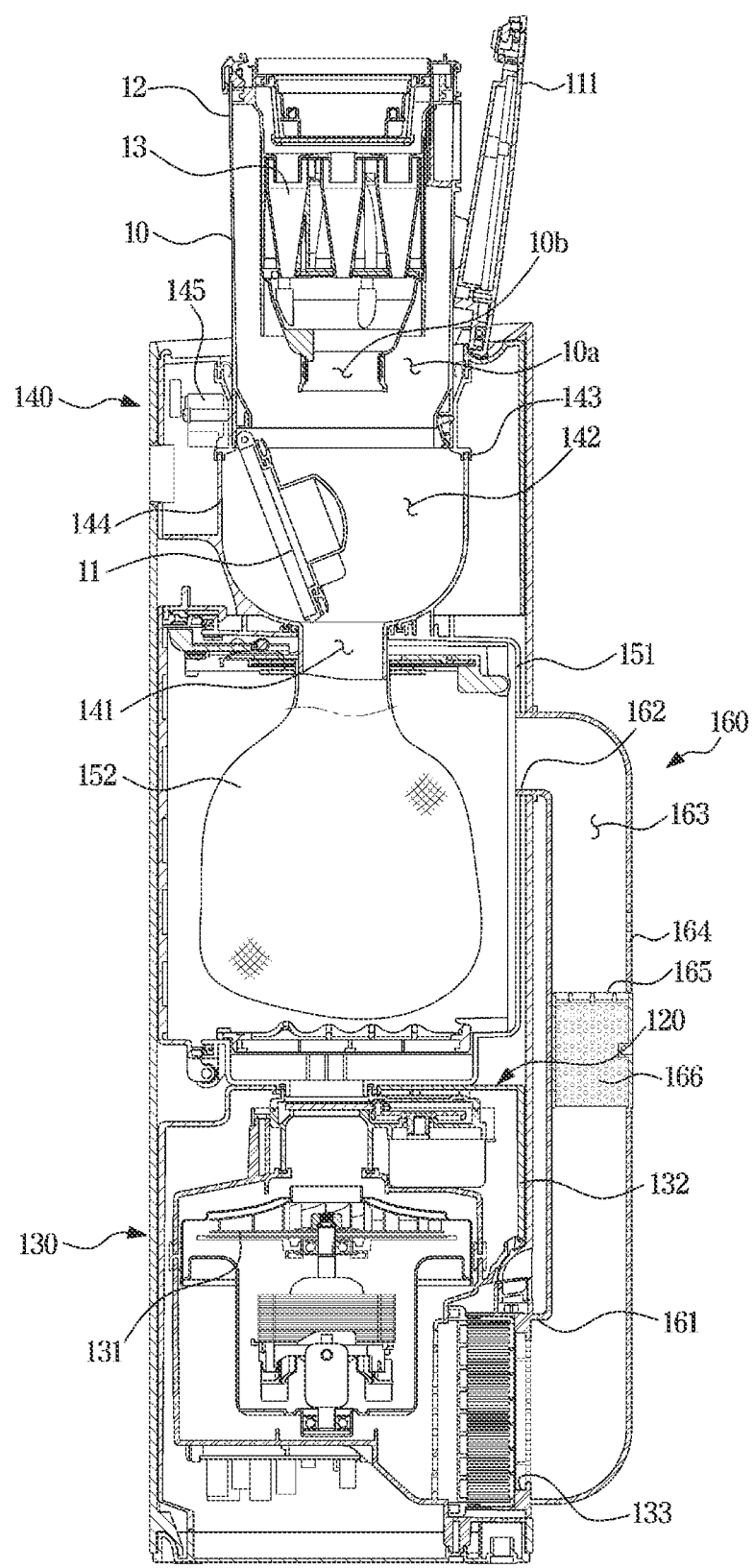
FIG. 7 is a side cross-sectional view of a cleaning device, according to another embodiment of the disclosure.

FIG. 7 is a side cross-sectional view of a cleaning device, according to another embodiment of the disclosure.

The circulation duct 160 may have one end 161 connected to the sucking device outlet 133 and the other end 162 connected to the collecting part 150. That is, unlike the circulation duct 160 in the previous embodiment of the disclosure, the other end of the circulation duct 160 in this embodiment of the disclosure may be connected to the collecting part 150 instead of the docking part 140.

Accordingly, the docking part 140 may be provided such that the circulating air forced by air flowing in from the outside to be moved around and brought in from the collecting part 150 and from the circulation duct 160 may be mixed up with outside air.

According to embodiments of the disclosure, a cleaning device may include a circulation path in which air discharged from a docking station is circulated, having reduced noise because an amount of the air discharged from the docking station is reduced as more air circulates through the docking station multiple times, and having higher probability of deodorization of the air finally discharged from the docking station because the air is deodorized while circulating around.

According to embodiments of the disclosure, the docking station may include a vibrator arranged to apply physical force to the dust collector, making dirt and dust collected in the dust collector fall off from the dust collector, thereby efficiently getting rid of the dirt and dust collected in the dust collector.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

What is claimed is:

1. A cleaning device comprising:
   a vacuum cleaner including a dust collector into which an object is collected;
   a docking station having a long axis which extends in a vertical direction of the docking station,
   wherein the docking station comprises:
      a docking part configured to allow the dust collector to be docked to the docking part,
      a sucking device to suck the object and air from an inside of the dust collector while the dust collector is docked to the docking part,
      a collecting part arranged between the docking part and the sucking device along the long axis to collect the object which is sucked by the sucking device, and
      a circulation duct having a first end connectable to the docking part and a second end connectable to the sucking device so that the air from the inside of the dust collector sucked by the sucking device flows downward along the long axis into the sucking device through the collecting part and flows upward into the docking part through the circulation duct, and the air flowed upward into the docking part through the circulation duct is to be moved into the collecting part.

2. The cleaning device of claim 1, wherein the sucking device comprises:
   a fan to move air, and
   a sucking device outlet configured to be arranged for the air moved by the fan to be discharged out of the sucking device, and
   wherein of the second end of the circulation duct connectable to the sucking device is formed to be connected to the sucking device outlet.

3. The cleaning device of claim 2, wherein the docking part comprises:

a seating space into which at least a portion of the dust collector is insertable and a docking part housing which forms the seating space, and wherein the first end of the circulation duct is formed to be connected to the seating space through the docking part housing.

4. The cleaning device of claim 2, wherein the circulation duct comprises a duct outlet configured so that at least a portion of the air moved from the circulation duct is discharged out of the docking station.

5. The cleaning device of claim 4, wherein a discharge area of the duct outlet is formed to be smaller than a discharge area of the sucking device outlet.

6. The cleaning device of claim 5, wherein the discharge area of the duct outlet is formed to be $1/10$ of the discharge area of the sucking device outlet.

7. The cleaning device of claim 1, wherein the circulation duct further comprises a deodorization filter arranged to filter air moving in the circulation duct.

8. The cleaning device of claim 7, wherein the deodorization filter is arranged to be coupled to and decoupled from the circulation duct.

9. The cleaning device of claim 8, wherein the deodorization filter comprises a first deodorization filter and a second deodorization filter including absorptive layers of different ingredients, and wherein one of the first deodorization filter and the second deodorization filter is selectively coupled to the circulation duct.

10. The cleaning device of claim 1, wherein air moved to the docking part through the circulation duct is forced by the sucking device to be circulated to the sucking device via the collecting part.

11. The cleaning device of claim 1, wherein the collecting part comprises:

a collector arranged to be connected to the docking part and attachable to and detachable from the collecting part, and collect the object brought in from the docking part, and wherein the air moved to the docking part through the circulation duct is forced to be moved into the collector.

12. A cleaning device comprising:

a vacuum cleaner including a dust collector into which an object is collected;

a docking station formed to be connected to the dust collector and having a long axis which extends along a direction, wherein the docking station comprises:

a docking part formed to allow the dust collector to be docked to the docking part to remove the object collected in the dust collector, the docking part including a vibrator arranged to deliver vibration to the dust collector inserted to the docking part, a sucking device to suck the object and air from an inside of the dust collector while the dust collector is docked to the docking part, and a circulation duct arranged for the air sucked by the sucking device to be circulated to the docking part.

13. The cleaning device of claim 12, wherein the docking part comprises:

a seating space into which at least a portion of the dust collector is insertable and a docking part housing which forms the seating space, and wherein the vibrator is installed at the docking part housing.

14. The cleaning device of claim 12, wherein the vibrator is arranged to be operated together while the sucking device is activated.

* * * * *